(12) United States Patent
Berlin et al.

(10) Patent No.: US 7,577,595 B2
(45) Date of Patent: Aug. 18, 2009

(54) METHOD AND SYSTEM OF CONDUCTING ELECTRONIC COMMERCE UTILIZING A CONSOLIDATOR

(76) Inventors: Phil A. Berlin, 19751 Dorado Dr., Trabuco Canyon, CA (US) 92679; David S. Grant, 22391 Rosebriar St., Mission Viejo, CA (US) 92692

( * ) Notice: Subject to any disclaimer, the term of this patent is extended or adjusted under 35 U.S.C. 154(b) by 0 days.

(21) Appl. No.: 12/188,422

(22) Filed: Aug. 8, 2008

(65) Prior Publication Data

US 2008/0294535 A1   Nov. 27, 2008

Related U.S. Application Data

(60) Continuation of application No. 11/958,555, filed on Dec. 18, 2007, which is a continuation of application No. 11/754,525, filed on May 29, 2007, which is a division of application No. 10/470,884, filed as application No. PCT/US01/11904 on Apr. 11, 2001.

(60) Provisional application No. 60/274,083, filed on Mar. 7, 2001.

(51) Int. Cl.
G06Q 30/00 (2006.01)
G06F 17/30 (2006.01)

(52) U.S. Cl. .......................................... 705/26; 705/27
(58) Field of Classification Search ................ 705/1, 705/14, 26–27
See application file for complete search history.

(56) References Cited

U.S. PATENT DOCUMENTS

| 4,992,940 A | 2/1991 | Dworkin |
| 5,897,622 A | 4/1999 | Blinn et al. |
| 6,016,504 A | 1/2000 | Arnold et al. |

(Continued)

FOREIGN PATENT DOCUMENTS

WO    WO 00/31657    *    6/2000

OTHER PUBLICATIONS

"Anything Internet Enters Into Affiliate Agreement With Barnes &Noble.com; Anything Internet Launches Co-Branded AnythingBOOKS.com". Business Editors/High Tech Writers. Business Wire. New York: Aug. 16, 1999. p. 1 [recovered from Proquest database on Jun. 1, 2009].*

(Continued)

*Primary Examiner*—Jeffrey A. Smith
*Assistant Examiner*—William J. Allen
(74) *Attorney, Agent, or Firm*—Fish & Associates, PC

(57) ABSTRACT

The present invention provides an electronically accessible site that lists a product and associated distributors that distribute the product to customers. A customer purchases a product from the electronically accessible site, and during the purchasing process, the customer selects the distributor he wants to receive the product from. The order is received by an agent, and transmitted to the selected distributor for eventual distribution of the product to the customer. In response to the purchase, the agent and electronically accessible site receive compensation based on the amount of the purchase.

9 Claims, 3 Drawing Sheets

U.S. PATENT DOCUMENTS

| | | | |
|---|---|---|---|
| 6,029,141 A * | 2/2000 | Bezos et al. | 705/27 |
| 6,681,229 B1 * | 1/2004 | Cason et al. | 707/101 |
| 7,103,566 B2 * | 9/2006 | Silva et al. | 705/26 |
| 7,197,475 B1 * | 3/2007 | Lorenzen et al. | 705/26 |
| 7,349,879 B2 | 3/2008 | Alsberg et al. | |
| 7,373,314 B2 | 5/2008 | Aliabadi et al. | |
| 7,412,409 B2 | 8/2008 | Aliabadi et al. | |
| 2001/0034658 A1 * | 10/2001 | Silva et al. | 705/26 |
| 2002/0038255 A1 * | 3/2002 | Tarvydas et al. | 705/26 |
| 2002/0107861 A1 | 8/2002 | Clendinning et al. | |

OTHER PUBLICATIONS www.bizrate.com. Feb. 29, 2000. [recovered from Internet Archive Database (www.archive.org) on Jun. 1, 2009].*

"Catalog City Gains E-Commerce Momentum". PR Newswire. Oct. 19, 1998. [Obtained from EIC/Dialog search on Jan. 13, 2009].*

"e-Volve: Succeeding in the Digital Culture of Tomorrow". Kanter, Rosabeth Moss. 2001. [Obtained from EIC/Dialog search on Jan. 13, 2009].* http://en.wikipedia.org/wiki/Google_Product_Search.

* cited by examiner

METHOD AND SYSTEM OF CONDUCTING ELECTRONIC COMMERCE UTILIZING A CONSOLIDATOR

This application is a continuation of co-pending utility application Ser. No. 11/958,555 filed Dec. 18, 2007 which is a continuation of co-pending utility application Ser. No. 11/754,525 filed May 29, 2007, which is a divisional of application Ser. No. 10/470,884 filed Jan. 13, 2004, which is a national phase filing of PCT/US01/11904 filed Apr. 11, 2001, which claims priority to provisional application 60/274,083 filed Mar. 7, 2001.

FIELD OF THE INVENTION

The field of the invention is electronic commerce.

BACKGROUND

Acquiring items of commerce takes time. To save time, consumers often classify items in categories, and attempt to purchase multiple items from a category on each shopping trip. The categories are generally based on the type of store that sells the item. For example, a consumer may have a category for grocery store, home improvement store, office supply store, clothes store, and so on. Thus, the consumer may save time by buying more than one item on each trip to the store.

Consumers often attempt to classify items broadly in order to save additional time. Purchases of food, clothes, home improvements, and office supplies may often be made in a single variety type store. The problem with such variety stores is that there is often less of a selection of a particular good than in a specialty store. The consumer may still have to spend time and money on trips to specialty stores to get the items he desires.

Mail order catalogs emerged in part to help consumers save time and money shopping for goods by offering purchase of products by mail. By purchasing through mail order catalogs, a consumer could save time on travel and location of the goods. Not only were mail order catalogs time savers for many consumers, they provided the capability to purchase generally inaccessible products. For example, early catalogs such as Montgomery Wards' catalog offered items that the consumer could not easily acquire because stores may not have been close, and transportation may have been limited.

Many of the early catalogs offered a wide variety of goods, and the consumer generally enjoyed surfing the pages of the catalogs to ponder purchase of items he may not have otherwise had available to him. Even with the entertainment value of surfing a large catalog, purchasing was a time consuming activity nonetheless.

Electronic catalogs eventually emerged. The electronic catalogs frequently offer the same type of goods that its mail order counterpart offered. Vendors, catalog companies, and consumers all may benefit from the automation. The product vendor may have its products more widely distributed, and may have additional product distributors available to him. The catalog company may have the benefit of a larger and more accessible marketplace, alternative advertising methods, and lower cost of catalog creation and distribution. The consumer may have enhanced searching capability, perhaps a more extensive product list, as well as an incremental savings of time. A continuing problem, even with electronic catalogs, however, is that the consumer may need to visit multiple catalog sites to accomplish all of his online purchases. The need to visit multiple sites results in persistence of many of the traditional problems such as time to locate the item, and time to arrange the purchase, including entry of credit card number, name, and address.

To solve problems related to the need to purchase from many different catalog sites, electronic variety type sites have emerged that combine the products of a plurality of catalogs. One such site is www.catalogfavorites.com. While this and other similar sites may provide relatively more products than those utilizing the products of a single catalog, there are detriments to such sales models.

A particular detriment of a variety site may exist when there is more than one catalog (and distributor) offering the same product. In this situation, the site has the choice of choosing for itself the catalog that will receive credit for the sale and the distributor that will distribute the product. The alternative may be not listing the product at all. In either case, the consumer has no choice over who ultimately sells and distributes the product. The consumer may want to choose the distributor and catalog for a variety of reasons. The consumer may, for example, have received products that were broken during shipping, may have a family member working for one of the companies, a moral conflict with one of the companies, or may even own stock in one of the companies.

Sites such as www.carsdirect.com are similar to variety type catalog sites because they display products from more than one car dealer. However, some of the same problems exist with these sales models. The cars that carsdirect.com sells are obtained from the car dealers, and the consumer may have reason to choose which dealer will ultimately sell him the car.

Another problem with such electronic sales sites is that the consumer may still spend time to locate the site itself. The mere existence of electronic commerce sites on the Internet does not save a consumer time. Online searches for sites often take considerable time, and return thousands of entries many of which are entirely inappropriate. Even with automated selling, much time and effort is spent locating appropriate sites.

Thus, there is a need to provide improved methods of electronic commerce particularly those that save the consumer time and effort and give the consumer added control over the purchase.

SUMMARY OF THE INVENTION

The present invention provides an electronically accessible site that lists a product and associated distributors that distribute the product to customers. A customer purchases a product from the electronically accessible site, and during the purchasing process, the customer selects the distributor he wants to receive the product from. The order is received by an agent, and transmitted to the selected distributor for eventual distribution of the product to the customer. In response to the purchase, the agent and an electronically accessible site receive compensation.

A particularly preferred embodiment of the present subject matter is directed to a method of conducting electronic commerce having an agent that consolidates data related to products and distributors into a standardized format. The agent sells the products, and also offers the data to electronically accessible sites that sell the products. The agent and the electronically accessible sites also allow the consumer to choose the distributor of the products they are purchasing. If the order is placed on the electronically accessible site, the order information is sent to the agent who forwards it to the selected distributor for shipment to the consumer. The agent receives compensation for his part in the transaction.

Various objects, features, aspects, and advantages of the present invention will become more apparent from the following detailed description of preferred embodiments of the invention, along with the accompanying drawings in which like numerals represent like components.

DETAILED DESCRIPTION

Figure 1:
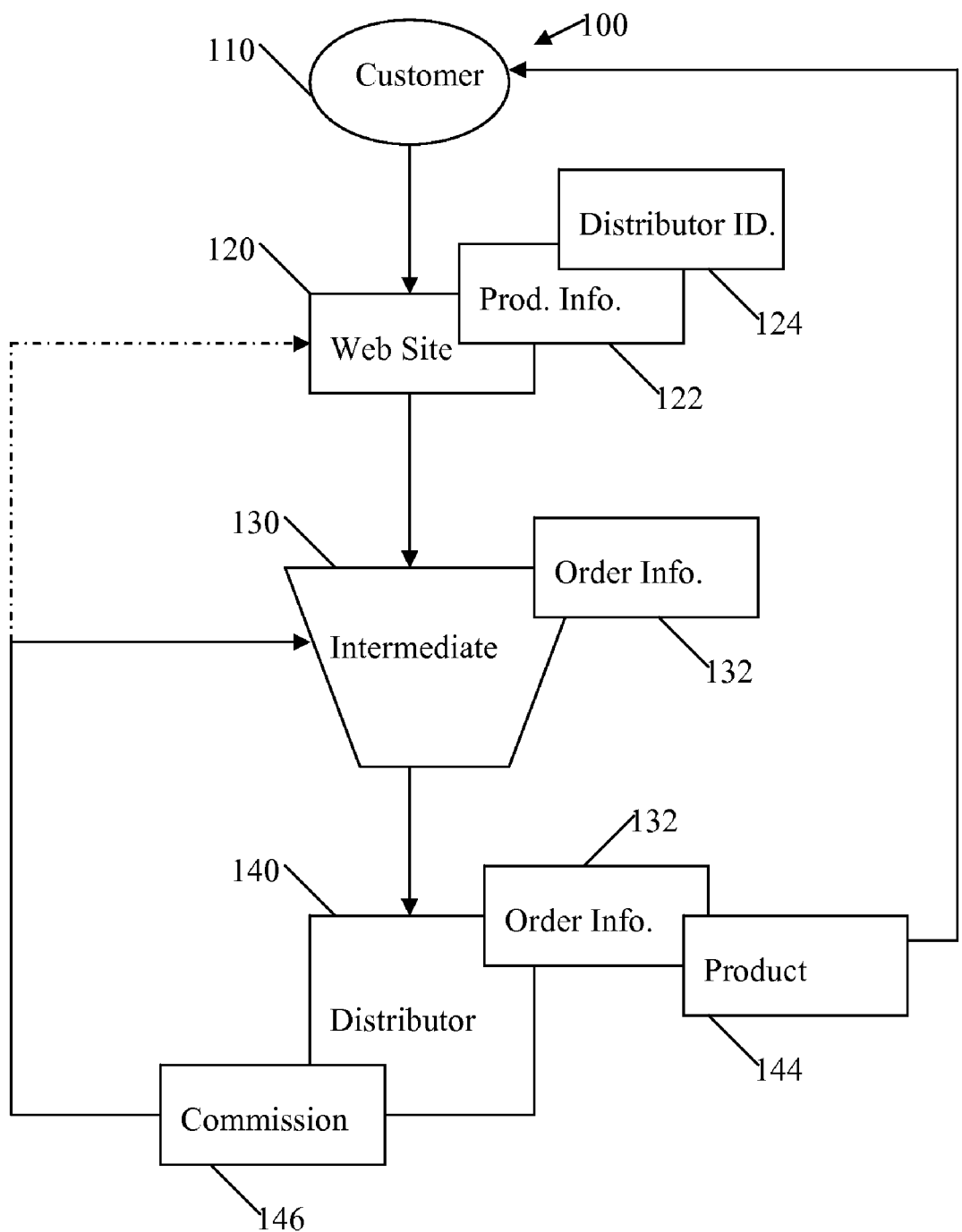
FIG. 1 is a schematic of an online purchase made through a method or system according to the present invention.

In FIG. 1, an online purchasing method 100 generally includes a customer 110, a web site 120, an intermediate 130 and a distributor 140. The web site 120 hosts product information 122 and distributor identification 124. The intermediate 130 receives order information 132 and the distributor identification 124 from the web site 120, and the order information 132 is transmitted to the distributor 140, who responds by shipping the product 144 and paying commission 146.

The customer 110 may be any entity making an electronic purchase including business entities and automated purchasing agents. The customer 110, however, is typically an individual who purchases a product 144 over the Internet, but such electronic purchases are not limited to the Internet, and may include purchases over other public or private networks.

The term Internet generally refers to a public package switched network. The term "electronic" or "e-" as used herein and in conjunction with "purchase" or "commerce" includes transactions that are concerned with or use a device or apparatus that operates on principles governing the behavior of electrons. As used herein, the term "product" is anything that may be the subject of a commercial transaction including intangible goods and information. Two products are considered the "same product" if both have or would have the same UPC (uniform parcel code) according to UPC specifications.

The web site 120 is an electronically accessible site, and is preferably a web site of the World Wide Web made publicly accessible by an HTTP server. The preferred web site has an associated location or URL (uniform resource locator) on the World Wide Web that may be accessed through a web browser. Product related information 122 and distributor identification 124 may be displayed on the web site 120 to enable purchase of a product 144.

Preferred product information 122 includes an SKU (stock keepers unit) or some other product number, a product description, and a picture of the product. The customer 110 may be prompted for search criteria that is used to establish a list of products matching the criteria. The list, including product related information 122 and distributor identification 124, may then be displayed for the customer 110. The customer 110 may choose a product and associated distributor identification 124. In a situation where the same product exists for two separate distributors, express selection of the distributor may be made.

Express Selection of a Distributor

Express selection of a distributor identification 124 may be desirable because the customer 110 may have a preference as to the distributor 140 of the product. In a preferred embodiment, the distributor 140 may be a catalog company who has products being displayed on the web site 120 along with products of other catalog companies. Because the same product is sometimes carried by more than one catalog, there may be need for the customer 110 to choose the distributor identification 124 associated with the distributor 140 that he wants to purchase the product from. A customer 110 may have many reasons for choosing a certain distributor 140 including, for example, a positive or negative shipping experience, a family member working for one of the catalog companies, a moral conflict with one of the catalog companies, or even stock ownership in one of the catalog companies. As used herein, the term "express" means to actively manifest or communicate, and does not include a selection by inference or otherwise a selection that is unknown to the customer.

Order information 132 including product information 122, customer name and address (not shown), and distributor identification 124 may be transmitted to the intermediate 130. The intermediate 130 may be any entity that performs a function for compensation including consolidating the products from a plurality of catalog entities into a standardized format, offering the products for sale on its electronically accessible site, offering the products for sale on the electronically accessible site of another entity, and transmitting the order information 132 to the distributor 140. The preferred intermediate operates a web site that sells products from a variety of catalogs companies, and offers the products to an web site that hosts the products on its site. For a customer 110 engaging in electronic commerce, the existence of the intermediate 130 may be transparent. For example, the customer 110 may place his order on the web site 120 and may not immediately or in the future become aware that the order information 132 flows to the intermediate 130 before being delivered to the distributor 140.

In an aspect of the subject matter, at least one additional intermediate (not shown) may exist. The additional intermediate may operate as an agent that performs a function such as forwarding the order information 132 in exchange for compensation. The additional intermediate is contemplated to also have an electronically accessible site upon which the products may be sold.

The distributor 140 is an entity that distributes the product 140. Preferably, the distributor 140 is a catalog company that sells the product 144, and pays commission 146 to the intermediate 130 and possibly to the web site 120. It is contemplated that the distributor 140 may also be a manufacturer of the product. Typically, the distributor 140 addresses the product 144 to the customer 110, and puts the product 144 into the delivery stream.

Compensation paid to the intermediate 130 and the web site 120 may be in the form of a commission 146. In a preferred aspect, the commission 146 is a fixed percentage of the dollar amount of purchases that are consummated on the intermediate site (not shown) or the web site 120. Compensation may also be a variable percentage based on sales volume, product sold, purchasing entity, quantity ordered, or some other variable. Compensation could also be independent of sales volume.

Figure 2:
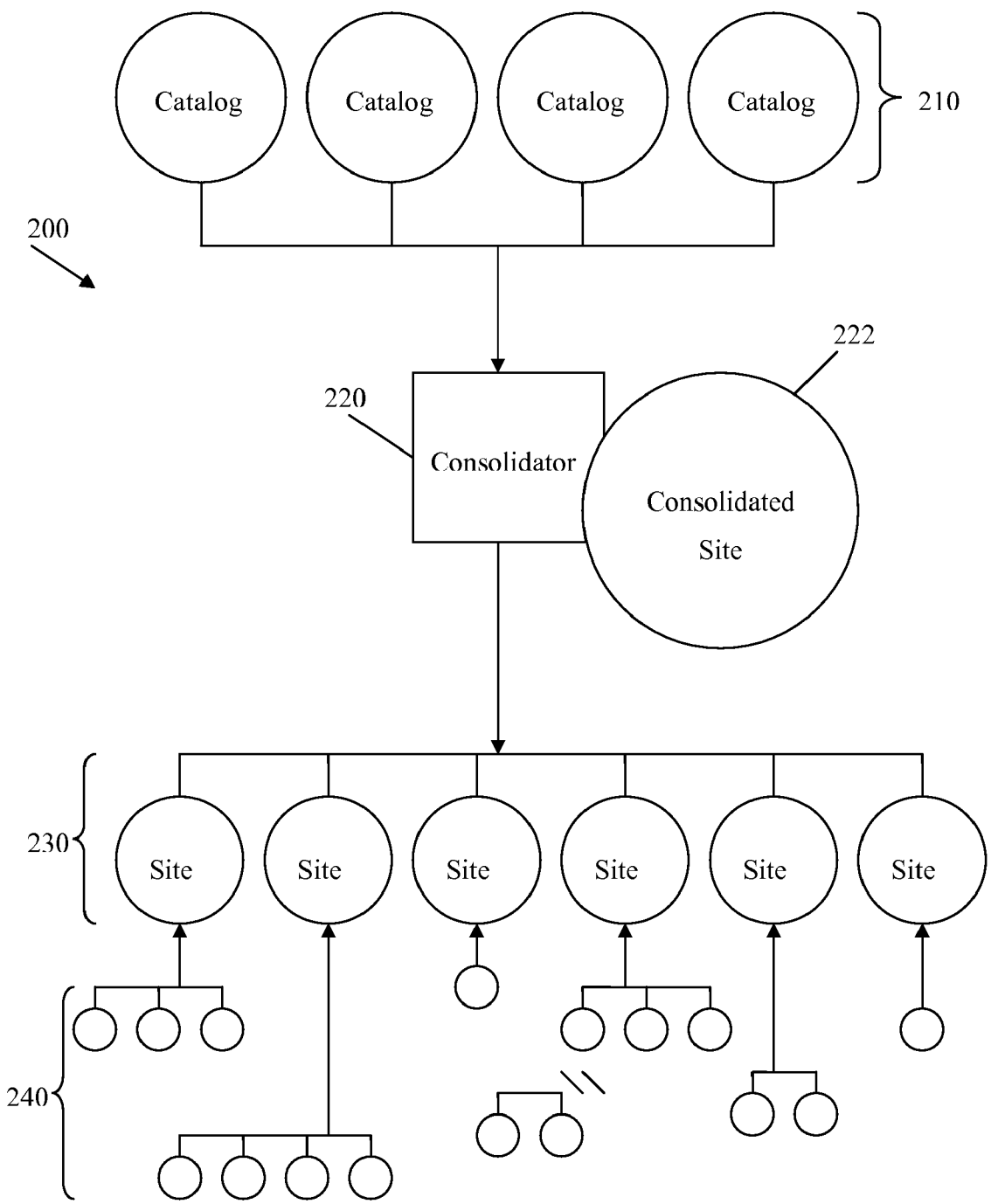
FIG. 2 is a schematic of the flow of catalog information.

In FIG. 2, a system 200, displaying the flow of product information, includes catalogs 210, a consolidator 220, the consolidator's web site 222, independent web sites 230, and consumers 240.

The catalogs 210 include sites that engage in e-commerce and do not have a mail order counterpart. However, the catalogs 210 are preferably companies that began as mail order catalogs and have expanded their presence to the Internet. The catalogs 210 may or may not have their own site on the Internet, but in any case, the catalogs 210 are generally willing to pay compensation to others to sell their products online.

The consolidator 220 is an entity that collects or consolidates product information from the catalogs 210. The consolidator 220 preferably has a consolidated web site 222 to display and sell the catalogs' products. The consolidator 220 may offer the product information or a subset of the product information to an independent web site 230, and preferably, the consolidator provides the technology to enable the independent web site 230 to access and host the product information.

As defined herein, the term "host" means to contain and have control over. For example, an entity that hosts product information contains the product information on a storage device that the entity has at least some control over. The term "host" does not refer to an entity that facilitates sale of products by providing a link such as hypertext back to a site that has control over the product information.

Sites 230 host product information that is received from the consolidator 220. Each site may have many physical and virtual locations and may include mirrored copies of the information in different locations. The hosting of the product information may occur on more than one storage device, and it is contemplated that the information may be distributed among a plurality of storage devices including RAID (redundant array of independent disks) devices.

Figure 3:
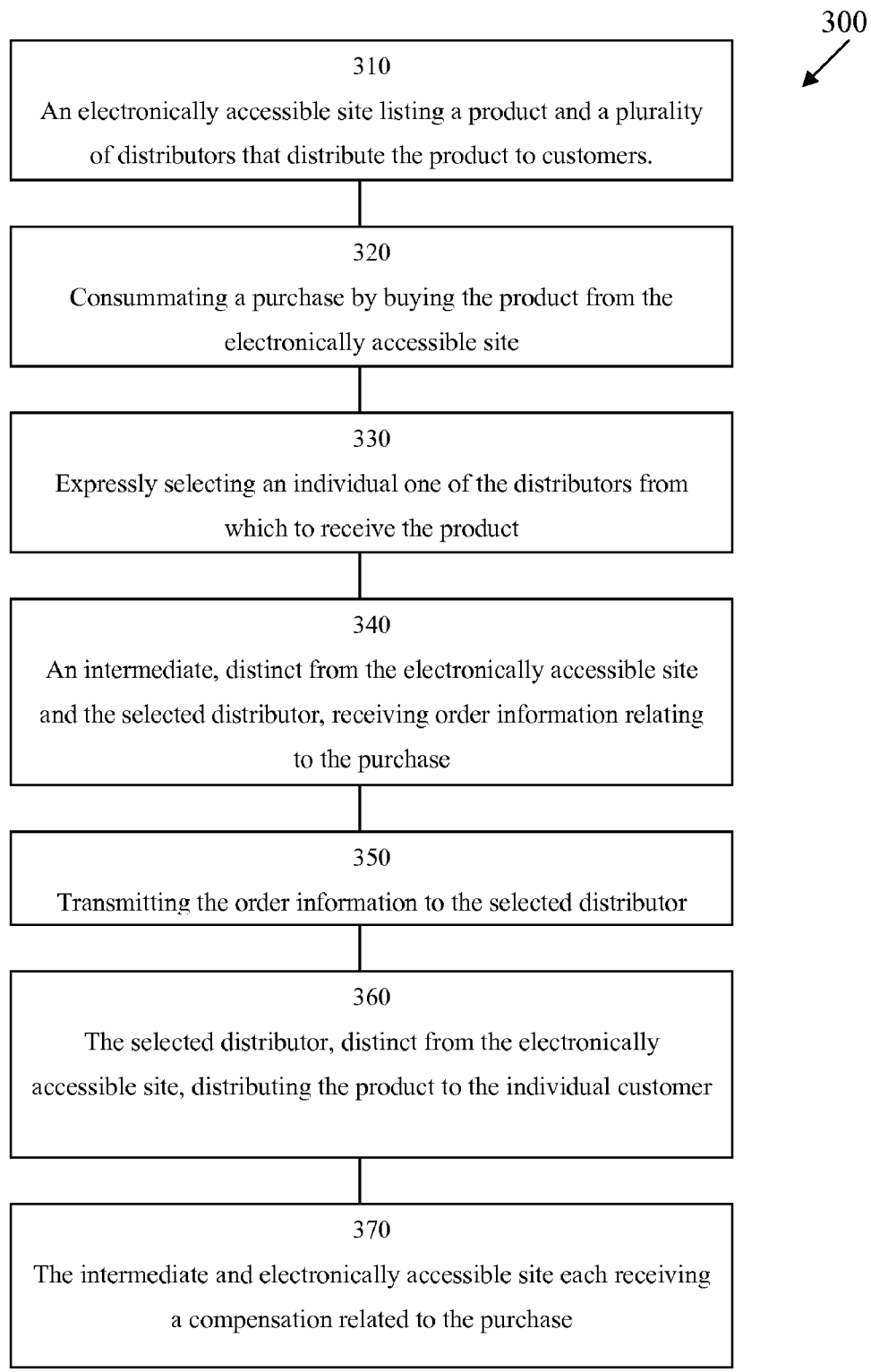
FIG. 3 is a block diagram of the steps of a method according to the present invention.

Referring to FIG. 3, a method 300 for conducting electronic commerce (1) the step 310 of an electronically accessible site listing a product and a plurality of distributors that distribute the product to customers; (2) the step 320 of consummating a purchase by buying the product from the electronically accessible site; (3) the step 330 of expressly selecting an individual one of the distributors from which to receive the product; (4) the step 340 of an intermediate, distinct from the electronically accessible site and the selected distributor, receiving order information relating to the purchase; (5) the step 350 of transmitting the order information to the selected distributor; (6) the step 360 of the selected distributor, distinct from the electronically accessible site, distributing the product to the individual customer; and (7) the step 370 of the intermediate and electronically accessible site each receiving a compensation related to the purchase.

Thus, specific embodiments and applications of electronic commerce have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A method of conducting electronic commerce utilizing a consolidator, comprising:

providing a product consolidator web server intermediary between an independent web site and a plurality of vendors, the consolidator web server intermediary being independent and distinct from the independent web site and the plurality of vendors;

consolidating product information from the plurality of vendors and storing the product information on the intermediary consolidator web server;

utilizing the independent web site to display the product information from different ones of the vendors offered from the intermediary consolidator web server to potential consumers in a format such that an ordering consumer from among potential consumers can expressly select a vendor from among the plurality of vendors to purchase a desired product;

taking an order from the ordering consumer for the desired product via the independent web site;

passing the order along to the selected vendor from the independent web site through the intermediary consolidator web server;

allowing the ordering consumer to purchase the desired products directly from the selected vendor via the independent web site and the intermediary consolidator server where the intermediary consolidator server is transparent to the ordering consumer;

wherein, the product information stored in a standardized format on the intermediary consolidator web server;

providing, by the intermediary consolidator web server, a subset of product information in the standardized format to the independent web site;

receiving, by the intermediary consolidator web server, compensation from the independent web site.

2. The method of claim 1 wherein the consolidated product information provided to the second consolidator web server includes product data from at least 100 of the plurality of vendors.

3. The method of claim 1 further comprising providing technology that enables the independent web site to access and to host the product information.

4. The method of claim 1 wherein the step of taking the order for the desired product comprises obtaining from the ordering consumer: a name and address; a stock keepers unit (SKU); and an identification of the selected vendor.

5. The method of claim 1, further comprising the intermediary consolidator web server informing the vendor to ship the product to the ordering consumers.

6. The method of claim 1 wherein the commission comprises a percentage of sales consummated via the intermediary consolidator web server.

7. The method of claim 1 further comprising the intermediary consolidator web server collecting the revenue from the ordering consumers, and distributing at least a portion of the revenue to the vendor.

8. A system for conducting electronic commerce utilizing an intermediary consolidator web server, the system comprising:

an intermediary consolidator web server configured to store product information from a plurality of vendors wherein, the intermediary consolidator web server is independent and distinct from the plurality of vendors;

an independent web site, connected to the intermediary consolidator web server over a network, configured to:

display to potential consumers the product information from different ones of the vendors in a format such that individual ones of the potential consumers can expressly select from among the plurality of vendors to purchase a desired product;

take an order from an ordering consumer for the desired product;

transmit the order to a selected vendor via the intermediary consolidator web server where the intermediary consolidator web server is transparent to the ordering consumer; and provide contact information to the potential consumers to purchase the desired product directly from the selected vendor, instead of purchasing from the independent web site;

wherein, the intermediary consolidator web server is further configured to:

store the product information in a standardized format;

provide a subset of product information in the standardized format to the independent web site; and receive compensation from the independent web site.

9. The system of claim 8, further comprising the independent web site configured to collect a revenue from the ordering consumer, and distribute at least a portion of the revenue to the selected vendor.

* * * * *

UNITED STATES PATENT AND TRADEMARK OFFICE
CERTIFICATE OF CORRECTION

| | | |
|---|---|---|
| PATENT NO. | : 7,577,595 B2 | Page 1 of 1 |
| APPLICATION NO. | : 12/188422 | |
| DATED | : August 18, 2009 | |
| INVENTOR(S) | : Phil A. Berlin et al. | |

It is certified that error appears in the above-identified patent and that said Letters Patent is hereby corrected as shown below:

Title page:  In Line 60, delete "filed as application No. PCT/US01/11904 on Apr. 11, 2001" and insert -- which is a national phase filing of PCT/US01/11904 filed Apr. 11, 2001 --, therefor.

Signed and Sealed this
Seventeenth Day of January, 2012

David J. Kappos
*Director of the United States Patent and Trademark Office*